United States Patent
Dusaitis et al.

(10) Patent No.: US 11,435,430 B2
(45) Date of Patent: Sep. 6, 2022

(54) UTILIZING MULTIPATH TO DETERMINE DOWN AND REDUCE DISPERSION IN PROJECTILES

(71) Applicant: BAE SYSTEMS Information and Electronic Systems Integration Inc., Nashua, NH (US)

(72) Inventors: Peter Dusaitis, Manchester, NH (US); Matthew F. Chrobak, Groton, MA (US); Brian J. Smith, Nashua, NH (US); Paul D. Zemany, Amherst, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 17/112,118

(22) Filed: Dec. 4, 2020

(65) Prior Publication Data
US 2022/0179034 A1 Jun. 9, 2022

(51) Int. Cl.
*G01S 3/02* (2006.01)
*G01S 5/02* (2010.01)
*H04B 17/10* (2015.01)

(52) U.S. Cl.
CPC .......... *G01S 5/0273* (2013.01); *G01S 5/0218* (2020.05); *G01S 5/02525* (2020.05); *H04B 17/102* (2015.01)

(58) Field of Classification Search
CPC .. G01S 5/0273; G01S 5/0218; G01S 5/02525; G01S 5/0244; G01S 19/22; H04B 17/02

USPC .................................. 342/462, 453, 357.61
See application file for complete search history.

(56) References Cited

U.S. PATENT DOCUMENTS

| | | | | |
|---|---|---|---|---|
| 3,856,237 A | * | 12/1974 | Torian | F41G 7/2266 244/3.14 |
| 5,631,654 A | * | 5/1997 | Karr | G01S 11/12 250/342 |
| 6,896,220 B2 | * | 5/2005 | McKendree | F41G 7/007 244/3.15 |
| 6,956,523 B2 | * | 10/2005 | Mohan | G01S 7/025 342/104 |
| 7,207,517 B2 | * | 4/2007 | McKendree | F41G 7/007 244/3.15 |
| 7,388,538 B1 | | 6/2008 | Thompson, III | |

(Continued)

*Primary Examiner* — Chuong P Nguyen
(74) *Attorney, Agent, or Firm* — KPIP Law, PLLC; Scott J. Asmus

(57) ABSTRACT

A method for launching a round from an airborne platform, receiving a plurality of RF signals at the round, determining an amount of time between a first and second received RF signal, where the second signal is a multi-path signal and the first signal is a direct path signal. An altitude of the round is determined based on the delay between the first and second received signal and aligning the round's flight path with an initial velocity vector of the aircraft platform to reduce dispersion. The round can include a plurality of sensors for detecting the RF signals. The second received RF signal may be a multi-path signal having been reflected off of the earth's surface or another object on the earth's surface. The altitude of the round can be determined using the known altitude of the airborne platform, the delay of time between the first and second received signals, and the speed of light.

19 Claims, 5 Drawing Sheets

(56) References Cited

U.S. PATENT DOCUMENTS

| | | | |
|---|---|---|---|
| 8,022,860 B1 | 9/2011 | Mukai et al. | |
| 8,085,188 B2 * | 12/2011 | Tuxen | G01S 13/58 |
| | | | 342/173 |
| 8,912,945 B2 | 12/2014 | Tuxen | |
| 10,337,835 B2 * | 7/2019 | Smith | G01S 5/0263 |
| 10,345,078 B2 * | 7/2019 | Smith | G01S 5/0263 |
| 11,199,380 B1 * | 12/2021 | Ekhaus | F41G 7/224 |
| 2009/0295624 A1 | 12/2009 | Tuxen | |
| 2015/0338522 A1 * | 11/2015 | Miller | G01S 19/35 |
| | | | 342/357.61 |
| 2020/0235843 A1 * | 7/2020 | Zemany | H01Q 3/2611 |
| 2021/0231424 A1 * | 7/2021 | Zemany | F42C 11/002 |
| 2021/0278516 A1 * | 9/2021 | Choiniere | F41G 7/34 |

* cited by examiner

UTILIZING MULTIPATH TO DETERMINE DOWN AND REDUCE DISPERSION IN PROJECTILES

FIELD OF THE DISCLOSURE

The present disclosure relates to projectiles and more particularly to projectiles launched from a platform that uses RF signals and multipath signals to determine down and reduce dispersion errors.

BACKGROUND OF THE DISCLOSURE

When a round or projectile is launched from a platform, such as an airborne platform, there can be an initial dispersion that the round sees due to the initial thrust misalignment of the airborne platform. In one example, if the round does not have prelaunch communication, then after launch the round may drift off course in an unknown direction creating greater dispersion errors. Some systems can employ a dedicated system between the round and the platform to provide initial guidance to the round that is used immediately after launch. Such dedicated launch systems are not practical in many situations. Gravity or a magnetic field can be used in some applications in conjunction with inertial measurements units (IMUs) and accelerometers to detect the direction (up or down) of the round, however this does not adequately address the dispersion problem.

Wherefore it is an object of the present disclosure to overcome the above-mentioned shortcomings and drawbacks associated with launching a round from a platform to address the initial dispersion problem.

SUMMARY OF THE DISCLOSURE

One aspect of the present disclosure is a method comprising: receiving, via at least one sensor on a round, a plurality of RF signals transmitted by a platform such as an airborne platform; determining, via a processor of the round, an amount of time between a first received signal of the plurality of RF signals and a second received signal of the plurality of RF signals; determining, via the processor of the round, an altitude of the round based on the delay between the first received signal and the second received signal, wherein the second received signal is a multi-path signal; and aligning a flight path of the round, via the processor of the round, with an initial velocity vector of the airborne platform relative to ground using the altitude of the round, to thereby reduce dispersion.

One embodiment of the method is wherein the round uses Doppler to determine the initial platform's velocity vector. In some cases, the inherent RF signals include the identification friend or foe (IFF), electronic warfare radar, radar warning receiver or other radar-based systems that leverage RF signals emanating from the system.

Another embodiment of the method is wherein the second signal is a multi-path signal having reflected off of a surface of earth. In some cases, the altitude of the round is determined based on the amount of time and determined by multiplying the amount of time by the speed of light, and then subtracting an altitude of the airborne platform. In certain embodiments, the initial velocity vector is determined by Doppler, multipath timing, or Time Difference of Arrival.

Yet another embodiment of the method is wherein the RF signals are transmitted in an L-band frequency range of 0.5-1.5 Gigahertz (GHz) or a C-band frequency range of 4-8 GHz. In some cases, the plurality of RF signals are received by multiple sensors on the round.

Another aspect of the present disclosure is a method comprising: receiving, via at least one sensor on a round, a plurality of RF signals transmitted by an airborne platform; determining, via a processor of the round, a delay of time between a first received signal of the plurality of RF signals and a second received signal of the plurality of RF signals; and determining, via the processor of the round, a maximum amplitude of a mixed signal comprising the second received signal and the first received signal, the maximum amplitude indicating that the round's sensor is pointing down toward the ground.

One embodiment of the method further comprises: aligning a flight path of the round, via the processor of the round, with an initial velocity vector of the airborne platform relative to ground using the altitude of the round, to thereby reduce dispersion.

Another embodiment is wherein the altitude of the round is determined based on the amount of time and determined by multiplying the amount of time by the speed of light, and then subtracting a known altitude of the airborne platform.

Yet another aspect of the present disclosure is a round configured to be launched from an airborne platform, the round comprising: at least one sensor configured to receive a plurality of RF signals transmitted by the airborne platform; and a processor configured to determine a delay of time between a first received signal and a second received signal of the plurality of RF signals; wherein the processor is configured to determine a down position of the round's sensor based on the delay of time and to cause the round to align its flight path with an initial velocity vector of the airborne platform relative to the ground using the altitude of the round. In certain embodiments the round uses Doppler to determine the initial platform's velocity vector. In some cases, the second signal is a multi-path signal having reflected off of a surface.

One embodiment of the round is wherein the RF signals are transmitted in an L-band frequency range of 0.5-1.5 Gigahertz (GHz) or a C-band frequency range of 4-8 GHz. In certain cases, the plurality of RF signals are received by multiple sensors on the round.

Another embodiment is wherein the round comprises a weapon, a projectile, a ballistic, a bullet, a munition, or a guided weapon, an unmanned aerial vehicle (UAV), or an unmanned aerial system (UAS).

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

When a round or projectile is launched from a platform, it is subject to initial dispersion that can put the round in a situation that later corrections and guidance will not allow it to complete its mission and achieve the target location. By quickly correcting for the initial dispersion, the round has an improved likelihood of reaching the target location.

After launch, the round will receive a plurality of RF signals that emanate from the platform and in this example are used to guide the round toward a target location.

While some platforms have communication systems that are designed to communicate with the round sometime after launch to provide guidance information but is not immediately available upon launch. Furthermore, some rounds have various sensors and the ability to obtain internal guidance or guidance information from other resources but are not immediately available upon launch. In one example, the present system is intended during the initial dispersion stage until more reliable guidance information is available.

A direct signal can be received by the round first, and a multi-path signal (i.e., a signal that bounces or reflects off of earth or another object on the earth's surface) will be received by the round shortly thereafter, at a time after the first (direct) signal is received. By measuring the amount of time, this can be used to determine the attitude of the round (i.e., whether the round is "up" or "down"). The attitude of the round can be used to allow the round to align itself with an initial velocity vector of the platform to thereby reduce dispersion in the down direction.

The system of the present disclosure receives information being emitted from an aircraft, for example. even if it is not intended to be used as described herein. In other words, a platform is always emitting some sort of RF signal, and a round will see the "standard emitting signals" that leave the platform but also see them as they bounce off the ground and will use that information to orient itself.

A round as used herein is a weapon, a projectile, a ballistic, a bullet, a munition, or a guided weapon. In some embodiments, the platform is on land or on water. In some embodiments, the platform is airborne. An airborne platform as used herein can refer to any platform that is airborne and capable of launching a round, including but not limited to a helicopter, airplane, aircraft, unmanned aerial vehicle (UAV, unmanned aerial system (UAS), or other airborne vehicle).

Figure 1:
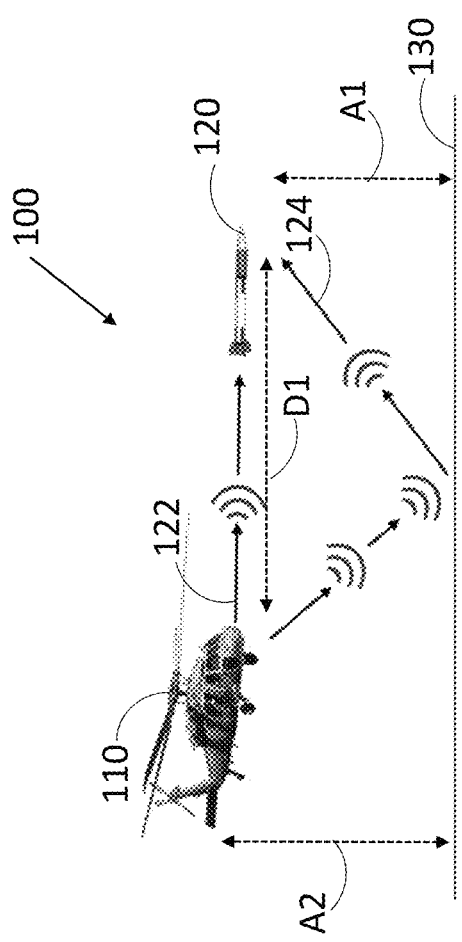
FIG. 1 is a diagram of one embodiment of a system including an airborne platform and a round as launched from the airborne platform, with the various RF signals radiated outward from the airborne platform, according to the principles of the present disclosure.

FIG. 1 is a diagram of one embodiment of a system including an airborne platform and a round as launched from the airborne platform, with the various RF signals radiated outward from the airborne platform, according to the principles of the present disclosure. The system 100 includes a platform 110 and a round 120 having been launched from the platform 110. The airborne platform 110 in this case is a helicopter, and the round 120 is a rocket or precision guided munition that spins upon launch. As shown, the round 120 obtains a first signal 122 as a direct path signal from the airborne platform 110, and a second signal 124 as a multi-path signal that has reflected off the earth's surface 130. It should be apparent that the direct path signal 122 will be received first in time, and the multi-path signal 124 will be received second.

By detecting the inherent RF signals from the platform, the round can use Doppler to determine the initial platform's velocity vector. The round typically requires its approximate speed to calculate the platform velocity vector. Once the round has detected the platform velocity vector from the origin, as it spins during initial launch the round can detect the multipath of the platform's signals bouncing off the surface below and establishes the down direction. Using the down direction and the initial velocity vector of its launch platform, the round can align itself with the platform's velocity vector relative to the ground to reduce dispersion.

In one example, the time delay between receiving both signals can be used to determine the altitude A1 of the round 120, as will be appreciated in light of the principles of the present disclosure. As will be described in greater detail below, the altitude A1 of the round 120 is determined according to the principles of the present disclosure, and used to align the round 120 with an initial velocity vector of the airborne platform 110 to reduce dispersion errors caused at launch. The altitude A2 of the airborne platform will likewise be used to determine the altitude A1 of the round, as will be appreciated in light of the present disclosure.

It will be appreciated that the inherent RF signals can be transmitted in an L-band frequency range of 0.5-1.5 Gigahertz (GHz) or a C-band frequency range of 4-8 GHz. The L-band advantageously has the presence of communication, navigation, and identification (CNI) signals, whereas the C-band allows radar altimeter signals to be coopted. If the launch platform uses a RADAR (usually X-band) this could also be a source of illumination. The illumination signal is emitted from the launch platform and the receive signal is unique to each round. Each round can utilize the information in its receive signal independently from any other round. There does not need to be any coordination between rounds.

Figure 2:
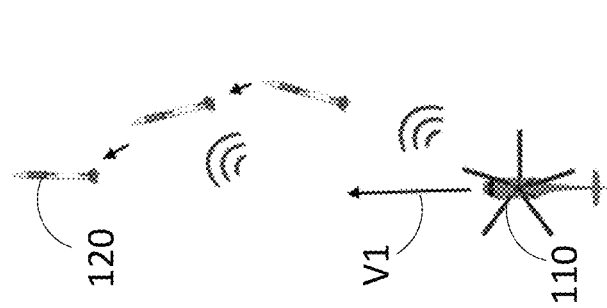
FIG. 2 is a diagram of one embodiment of the system as shown from a top view, illustrating the airborne platform and the round at various locations, according to the principles of the present disclosure.

FIG. 2 is a diagram of one embodiment of the system as shown from a top view, illustrating the airborne platform 110 and the round 120 at various locations, according to the principles of the present disclosure. The round 120 uses the inherent RF signals received from the airborne platform 110 to determine the velocity vector V1 of the airborne platform 110 through use of Doppler, multipath, or Time Difference of Arrival (TDOA). The velocity vector represents the rate of change of the position of a platform, wherein the magnitude of a velocity vector gives the speed, and the vector direction gives the direction.

The round 120 then corrects its dispersion errors to align with the velocity vector V1 of the airborne platform 110. For the round, at launch, the round will "disperse" statistically randomly. If, during the initial dispersion before guidance is available, the round descends, i.e. it goes down toward the earth, when the guidance comes on line, the round will need to burn fuel or expend energy trying to climb to a better elevation angle to complete its mission. If the round determines where the earth is (down) in early flight stages, the round can stay level or head up. When the round's guidance comes online, the round will not have to recover any range lost during the initial fly-out, thus extending its operational range. It is to be understood, that the ground is a "huge" reflector in most cases and side-lobes or direct path scattering of an RF signal is assured and generates multi-path RF signals. In traditional systems, the signal processes being exploited to make this system work are usually considered "interfering" signals. The method of the present disclosure is exploiting things that have often been considered a problem.

Figure 3:
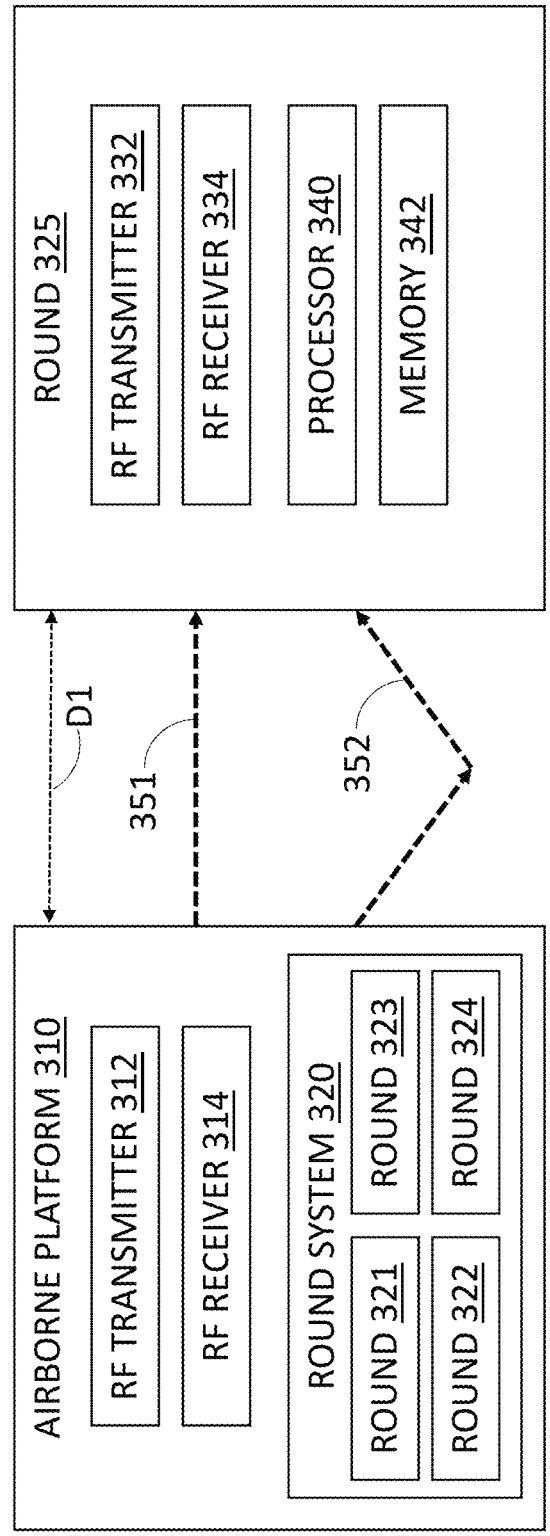
FIG. 3 is a block diagram of one embodiment of the system illustrating the airborne platform and the round in greater detail, according to the principles of the present disclosure.

FIG. 3 is a block diagram of one embodiment of the system illustrating the airborne platform and the round in greater detail, according to the principles of the present disclosure. The airborne platform 310 can be the same as, or substantially similar to, the airborne platform 110 shown and described herein, and likewise the round 325 can be the same as, or substantially similar to, the round 120 shown and described herein.

The airborne platform 310 includes an RF transmitter 312, an RF receiver 314, and a round system 320 comprising a plurality of rounds 321, 322, 323, 324. The RF transmitter 312 and the RF receiver 314 can be combined into a single transceiver device. Although only four rounds are shown, a greater or fewer number of rounds may be implemented, depending upon the particular application.

The round 325 includes a RF transmitter 332, a RF receiver 334, a processor 340, and memory 342. The RF transmitter 332 and RF receiver 334 can be combined into a single transceiver device. The RF receiver 334 is configured to receive a plurality of RF signals transmitted by the airborne platform 310. The processor 340 can be configured to timestamp each received RF signal so that the delay of time between each received signal can be determined. The values can be stored in memory 342.

The round 325 receives the direct path signal 351 as well as the multi-path signal 352, which can be a signal that is received after the direct path signal due to reflection off the earth. The direct path signal 351 can be the same as, or substantially similar to, the direct path signal 122 shown in FIG. 1, and the multi-path signal 352 can be the same as, or substantially similar to, the multi-path signal 124 shown in FIG. 1. The direct path signal 351 and the multi-path signal 352 can be used to determine the velocity vector of the platform and the altitude of the round, which allows the round to align itself to the velocity vector of the airborne platform from which it was launched, thereby reducing the initial dispersion.

As shown in the following Equation 1 (Eq. 1), the distance D1 between the round 325 and the airborne platform 310 can be determined from the direct path time and the speed of light (which is always constant):

$$T_{direct} = \frac{D1}{\text{Speed of Light}} \quad \text{Eq. 1}$$

By measuring the amount of time that it took for the round to receive the direct signal ($T_{direct}$), the distance D1 that the round has traveled can be determined. The altitude of the round must also be determined to properly guide the round without dispersion.

As shown in the following Equation 2 (Eq. 2), the altitude of the round (i.e., whether the round is up or down) can be determined based on the altitude of the airborne platform (altitude A2 in FIG. 1), the multipath delay time, and the speed of light:

$$T_{multi-path} = \frac{A1 + A2}{\text{Speed of Light}} \quad \text{Eq. 2}$$

Thus, by measuring the delay between the direct path and the multi-path signal ($T_{multi-path}$) and using the known altitude of the airborne platform A2, the altitude of the round can be determined.

Figure 4:
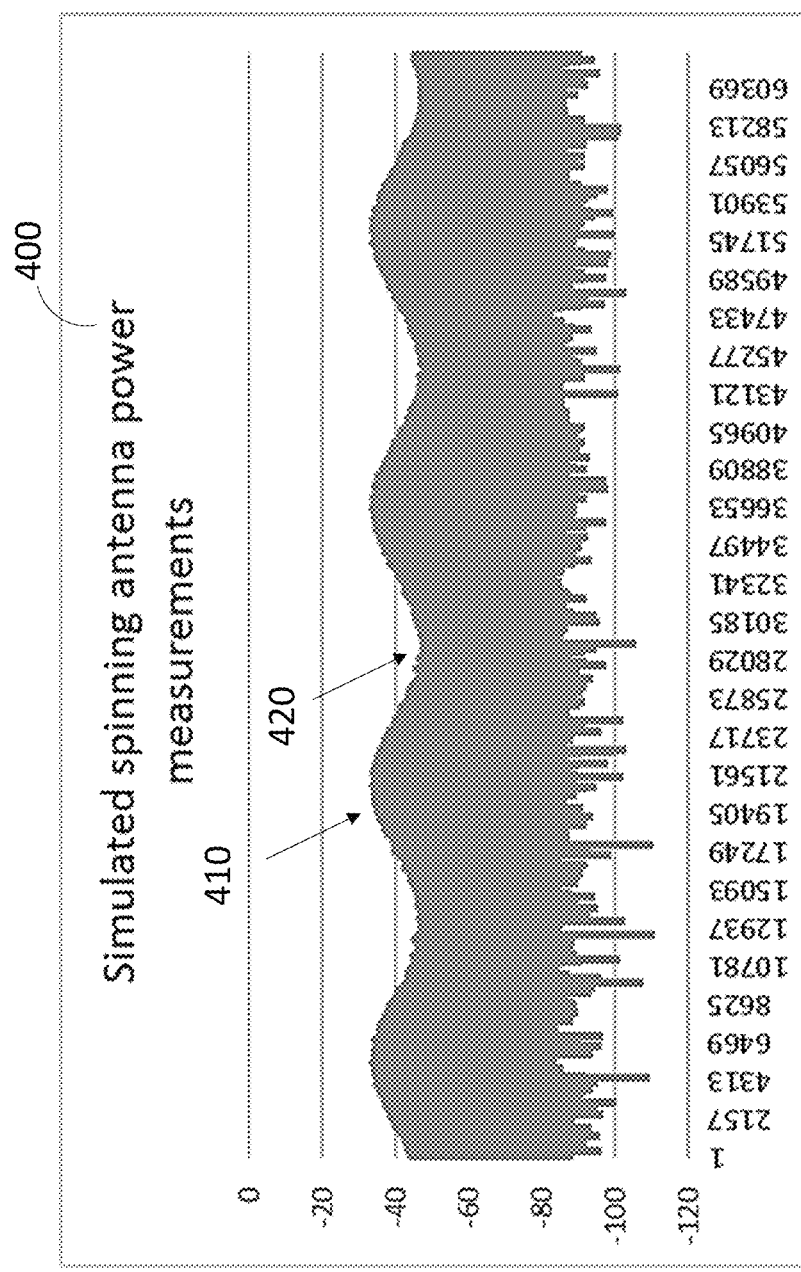
FIG. 4 is a graphical diagram illustrating simulated spinning antenna power measurements, according to the principles of the present disclosure.

FIG. 4 is a graphical diagram illustrating a simulated spinning antenna's power measurement, according to the principles of the present disclosure. The graph 400 illustrates a simulated amplitude modulation of a fixed gain antenna located on the outer surface of a spinning body (the round). The signal is maximum (at 410) when the multi-path is maximum, meaning the round is downward facing or "down." The signal is minimum (at 420) when the multi-path is minimum, meaning the antenna is pointed upward, "up" or toward the sky. It will be appreciated that multiple antennas can be situated in multiple angular locations on the spinning body surface with multiple receive channels.

An observable change is observed when the direct and multi-path signals are received simultaneously. Constructive or destructive interference causes a measurable alteration of the signal's envelope (a smooth curve outlining the signals extremes) and this changes as the range changes. This alteration in the signal's envelope caused by the destructive/constructive interference can be coupled with direct path signal alteration in real-time to amplify the distortion effects.

Figure 5:
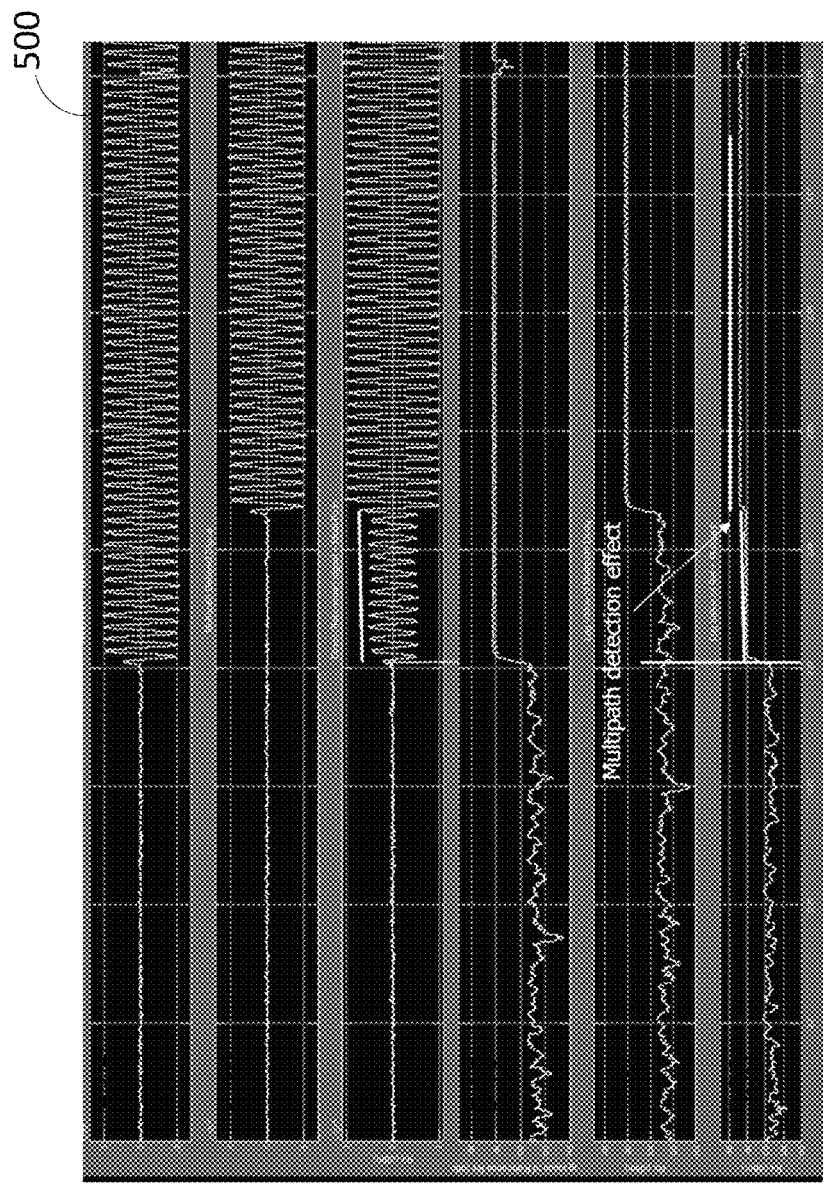
FIG. 5 is a graphical diagram of one embodiment of the system illustrating received RF signals, and processed RF signals, according to the principles of the present disclosure.

FIG. 5 is a graphical diagram 500 illustrating received RF signals, and processed RF signals, according to the principles of the present disclosure. The graphical diagram 500 includes a reference signal 510, a multi-path signal 520 (shifted in the time domain), an interference (mixed) signal 530—showing both constructive and destructive elements. The graphical diagram 500 also shows a logarithmic function of the reference signal 540, a logarithmic function of the multi-path signal 550, and a logarithmic function of the interference (mixed) signal 560. The logarithm of a signal is the exponent to which another fixed number must be raised to produce that signal. The change in logarithmic power level (shown as positive in this case) is the evaluation point. The amplitude difference (either positive or negative) or absence is based on roll angle and indicates direction. The greater the difference, the more aligned the receiver is with the multi-path signal from the ground. Thus, the greater difference tells us that the round is "down" also referred to as the amplitude of the round. In some cases, the round is spinning at a rate and oscillates between up and down. The round's receiver is ideally pointed "down" and not at the sky and thus that coupled with the time delay information gives an approximate altitude when compared with the known altitude of the platform.

Figure 6:
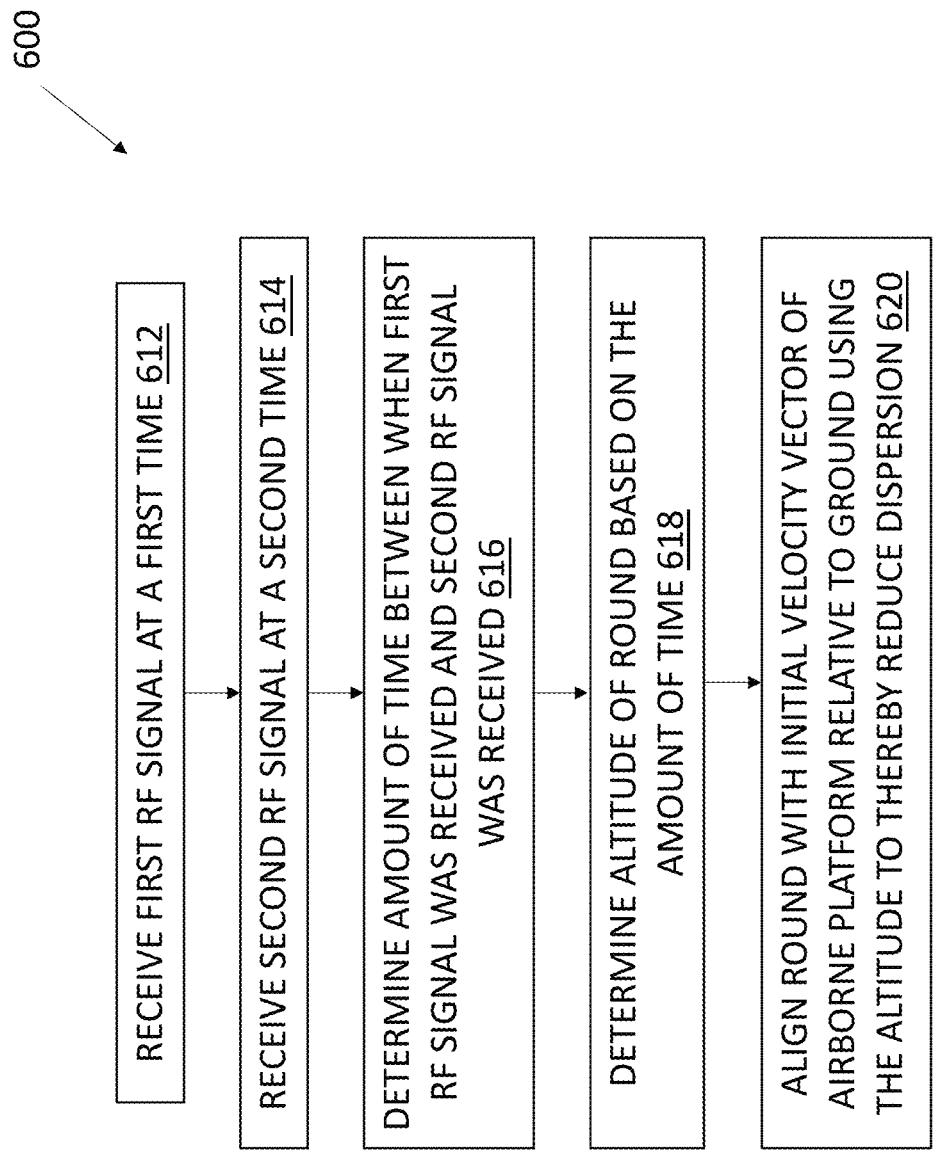
FIG. 6 is a flow chart of one embodiment of a method according to the principles of the present disclosure.

FIG. 6 is a flow chart of one embodiment of a method according to the principles of the present disclosure. The flow chart 600 commences at block 612 where a first RF signal is received on a round at a first time. This can be received by the RF receiver of the round (e.g., RF receiver 334 shown in FIG. 3). The flow chart 600 then continues to block 614 where a second RF signal is received on the round at a second time. This can be received by the RF receiver of the round (e.g., RF receiver 334 shown in FIG. 3). In some instances, the first RF signal and the second RF signal can be received by multiple sensors on the round. In some instances, the first RF signal can be received by a first sensor and the second RF signal can be received by a second sensor. In some cases, the system can detect this through the time delay between the detection of the two sensors. At block 616, the processor of the round determines an amount of time between when the first RF signal was received and when the second RF signal was received. This time delay can be computed using a comparison of the timestamp associated with the first RF signal and the timestamp associated with the second RF signal. At block 618, the altitude of the round is determined based on the amount of time between when the first RF signal was received and when the second RF signal was received. At block 620, the round aligns itself with an initial velocity vector of the airborne platform relative to the ground using the known altitude of the round, to thereby reduce dispersion in the down direction.

The computer readable medium as described herein can be a data storage device, or unit such as a magnetic disk, magneto-optical disk, an optical disk, or a flash drive. Further, it will be appreciated that the term "memory" herein is intended to include various types of suitable data storage media, whether permanent or temporary, such as transitory electronic memories, non-transitory computer-readable medium and/or computer-writable medium.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A method comprising:
   receiving, via at least one RF sensor on a round, a plurality of inherent RF signals transmitted by an airborne platform;
   determining, via a processor of the round, a time delay between a first received signal of the plurality of inherent RF signals and at least one second received signal, wherein the second received signal is at least one multi-path signal;
   determining, via the processor of the round, an altitude of the round based on the time delay between the first received signal and the second received signal; and
   aligning a flight path of the round, via the processor of the round, with an initial velocity vector of the airborne platform relative to ground to reduce initial dispersion.

2. The method of claim 1, wherein the round uses Doppler to determine the initial velocity vector.

3. The method of claim 1, wherein the inherent RF signals comprises identification friend or foe (IFF) electronic warfare radar, radar warning receiver or other radar-based system emanating from the airborne platform.

4. The method of claim 1, wherein the multi-path signal is reflected off of a surface of earth.

5. The method of claim 1, wherein the altitude of the round is determined based on the time delay, and determined by multiplying the time delay by the speed of light, and then subtracting an altitude of the airborne platform.

6. The method of claim 1, wherein the initial velocity vector is determined by Doppler, multipath timing, or Time Difference of Arrival.

7. The method of claim 1, wherein the inherent RF signals are transmitted in an L-band frequency range of 0.5-1.5 Gigahertz (GHz) or a C-band frequency range of 4-8 GHz.

8. The method of claim 1, wherein the plurality of inherent RF signals are received by multiple sensors on the round.

9. A method comprising:
   receiving, via at least one sensor on a round, a plurality of RF signals transmitted by an airborne platform;
   determining, via a processor of the round, a time delay between at least one first received signal of the plurality of RF signals and at least one second received signal of the plurality of RF signals; and
   determining, via the processor of the round, a maximum amplitude comprising the at least one second received signal and the first received signal, the maximum amplitude indicating that the at least one sensor on the round is pointing down toward a ground surface.

10. The method of claim 9, further comprising:

aligning a flight path of the round, via the processor of the round, with an initial velocity vector of the airborne platform relative to the ground surface using the altitude of the round, to thereby reduce dispersion.

11. The method of claim 9, wherein the altitude of the round is determined based on the time delay, and determined by multiplying the time delay by speed of light, and then subtracting a known altitude of the airborne platform.

12. The method of claim 9, wherein the at least one second received signal comprises at least one multi-path signal reflected from the ground surface.

13. A round configured to be launched from an airborne platform, the round comprising:

at least one sensor configured to receive a plurality of inherent RF signals transmitted by the airborne platform; and a processor configured to determine a delay of time between a first received signal from the airborne platform and a second received signal comprising multi-path signals;

wherein the processor is configured to determine a down position of the at least one sensor based on the delay of time and to cause the round to align its flight path with an initial velocity vector of the airborne platform relative to a ground surface using an altitude of the round that reduces initial dispersion.

14. The round of claim 13, wherein the round uses Doppler to determine the initial velocity vector of the airborne platform.

15. The round of claim 13, wherein the second signal is a multi-path signal having signals are reflected off of the ground surface.

16. The round of claim 13, wherein the inherent RF signals are transmitted in an L-band frequency range of 0.5-1.5 Gigahertz (GHz) or a C-band frequency range of 4-8 GHz.

17. The round of claim 13, wherein the plurality of inherent RF signals are received by multiple sensors on the round.

18. The round of claim 13, wherein the round comprises a weapon, a projectile, a ballistic, a bullet, a munition, a guided weapon, an unmanned aerial vehicle (UAV), or an unmanned aerial system (UAS).

19. The round of claim 13, wherein the round uses other guidance information to direct the round to a target once the initial dispersion has been reduced.

* * * * *